J. JOREY.
Whiffletree.
No. 1,642.
Patented June 17, 1840.
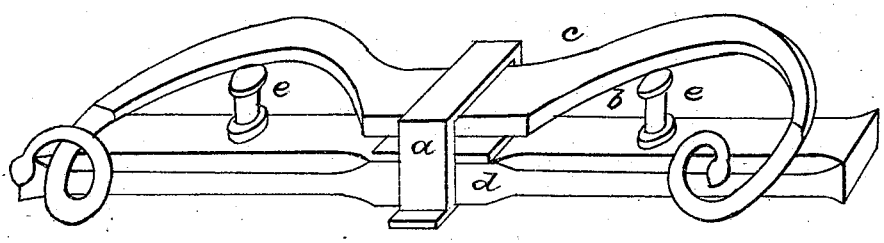

UNITED STATES PATENT OFFICE.

JAMES JOREY, OF STAFFORD, CONNECTICUT, ASSIGNOR TO BENJAMIN FOWLER, JR.

WHIFFLETREE FOR CARRIAGES.

Specification of Letters Patent No. 1,642, dated June 17, 1840.

*To all whom it may concern:*

Be it known that I, JAMES JOREY, of Stafford, in the county of Tolland and State of Connecticut, have invented a new and useful Improvement in the Common Whiffletree; and I do hereby declare that the following is a full and exact description.

The nature of my invention consists in applying a yoke to the center of the whiffletree, to prevent its becoming disengaged in that point, and two studs called side guards attached to the cross bar of the thills of carriages, to prevent too great vibration of the whiffletree.

To enable others skilled in the art to make and use my invention, I will proceed to describe its construction and operation.

I place a clasp or yoke (see $a$ in the accompanying drawing, which is intended to constitute a part of this specification) around the cross bar $b$ of the thills, inclosing also the whiffletree $c$ at the center of its length. The yoke closely embraces the front, back, and under side of the cross bar, but leaves sufficient space for the whiffletree to play freely within it, the whiffletree being narrower than the cross bar. The center bolt I usually join to the whiffletree. This bolt passing down through a washer $d$ and also through the cross bar, and under side of the yoke, forms, as usual, the center on which the whiffletree acts. This particular construction of the bolt, however, is not essential to my invention. To prevent the whiffletree from falling to the ground in case of the failure of this center bolt, is the use and object of the yoke before described. The studs $e$, $e$, called wing guards, inserted through the cross bar in front of whiffletree, are intended to limit the vibratory action of the whiffletree and prevent the horse from advancing so far as to disengage the thills from their supports in the harness in case of the breaking or unhooking of one of the traces.

What I claim as my invention and desire to secure by Letters Patent is—

The employment of the yoke in combination with the whiffletree and central pin, as described, and also the wing guards in combination with the whiffletree, for the purpose and in the manner described.

JAMES JOREY.

Witnesses:
BENJ. FOWLER, Jr.,
WILLIAM FULLER.